United States Patent
Kurple

(10) Patent No.: US 11,034,790 B2
(45) Date of Patent: Jun. 15, 2021

(54) POLYOLS FOR THERMOSET AND THERMOPLASTIC APPLICATIONS OF LIGNIN

(71) Applicant: Eric Kurple, Casco, MI (US)

(72) Inventor: Eric Kurple, Casco, MI (US)

( * ) Notice: Subject to any disclaimer, the term of this patent is extended or adjusted under 35 U.S.C. 154(b) by 148 days.

(21) Appl. No.: 15/379,373

(22) Filed: Dec. 14, 2016

(65) Prior Publication Data

US 2017/0096519 A1    Apr. 6, 2017

Related U.S. Application Data

(63) Continuation-in-part of application No. 13/769,759, filed on Feb. 18, 2013, now abandoned.

(60) Provisional application No. 61/599,863, filed on Feb. 16, 2012.

(51) Int. Cl.
| | |
|---|---|
| *C08G 18/18* | (2006.01) |
| *C08G 18/36* | (2006.01) |
| *C08G 18/64* | (2006.01) |
| *C08L 97/00* | (2006.01) |
| *C08G 101/00* | (2006.01) |

(52) U.S. Cl.
CPC ..... *C08G 18/6492* (2013.01); *C08G 18/1833* (2013.01); *C08G 18/36* (2013.01); *C08L 97/005* (2013.01); *C08G 2101/00* (2013.01); *C08G 2110/0025* (2021.01); *C08G 2190/00* (2013.01)

(58) Field of Classification Search
CPC .................. C08G 65/2612; C08L 97/005
See application file for complete search history.

(56) References Cited

U.S. PATENT DOCUMENTS

| | | | | |
|---|---|---|---|---|
| 6,025,452 A | * | 2/2000 | Kurple | B22C 1/2273 523/142 |
| 6,054,562 A | * | 4/2000 | Kurple | C08G 65/2612 524/539 |
| 9,593,221 B1 | * | 3/2017 | Kurple | C08J 9/0066 |
| 2017/0362406 A1 | * | 12/2017 | Li | B29B 17/00 |

FOREIGN PATENT DOCUMENTS

WO    WO-2015083092 A1 *    6/2015

\* cited by examiner

*Primary Examiner* — Melissa A Rioja
(74) *Attorney, Agent, or Firm* — Woodling, Krost and Rust

(57) ABSTRACT

A composition comprising: lignin, a polyol carrier compound and an isocyanate is disclosed. The lignin being mixed with the polyol carrier compound. The polyol carrier compound is selected from the group consisting of TCPP, TECP, TMCP, TDCP, ethoxylated and propoxylated phenols, tris-chloroisopropyl phosphate, amino methyl propanol, glycerin carbonate, polyether modified polysiloxanes, bromophthalic anhydride derivatives, propanediols; bromine, chlorine and/or phosphorus based fire retardents, epoxies, glycerins, sugar, glycols, certain natural oil based polyols and ethoxylated and or propoxylated alcohols. The lignin-polyol carrier compound mixture is reacted with the isocyanate producing a foam, plastic or other material. For a thermoplastic solid the same polyol carrier compounds are used but in higher percentages of lignin.

8 Claims, No Drawings

POLYOLS FOR THERMOSET AND THERMOPLASTIC APPLICATIONS OF LIGNIN

This application is a continuation of patent application Ser. No. 13/769,759 filed on Feb. 18, 2013. Patent application Ser. No. 13/769,759 filed on Feb. 18, 2013 is incorporated by reference hereto.

BACKGROUND

At the present time, to produce a lignin based thermoset polyol or thermoplastic polyol, a polyether or polyester polyol is used with a suitable lignin as set forth in U.S. Pat. No. 6,025,452.

U.S. Pat. Nos. 6,054,562 and 6,025,452 are incorporated herein by reference hereto in their entirety.

SUMMARY OF THE INVENTION

It has been discovered that ethoxylated or propoxylated phenols, or blends thereof; chloroisopropyl phosphates; butoxyethanols; amino methyl propanols; glycerin carbonates; polyether modified polysiloxanes; phthalic anhydrides; diethylene glycol-phthalic anhydride-based polyester polyol; bromophthalic anhydride derivatives; propanediols; bromine, chlorine, and/or phosphorus based fire retardants; epoxies; glycerins; sugar; glycols; certain natural oil based polyols and ethoxylated and/or propoxylated alcohols can be used as one polyol carrier component in a polyol-isocyanate product. Lignin is used as the polyol component in the polyol-isocyanate product.

Still further, sugars and/or glycols may be used in thermoset applications and in some thermoplastic applications.

A composition comprising lignin and a polyol-carrier compound is disclosed. The lignin is mixed with the polyol-carrier compound. The polyol-carrier compound is selected from the group consisting of TCPP, TECP, TMCP, TDCP, ethoxylated or propoxylated phenols, or blends thereof; chloroisopropyl phosphates; butoxyethanols; amino methyl propanols; glycerin carbonates; polyether modified polysiloxanes; phthalic anhydrides; diethylene glycol-phthalic anhydride-based polyester polyol; bromophthalic anhydride derivatives; propanediols; bromine, chlorine, and/or phosphorus based fire retardants; epoxies; glycerins; sugar; glycols; certain natural oil based polyols and ethoxylated and/or propoxylated alcohols. The lignin-polyol-carrier compound mixture produces a thermoplastic material. For purposes of this patent a polyol-carrier compound will be defined as a compound that is miscible with lignin acting as carrier agent allowing the lignin to be utilized in a liquid mixture or as a meltable solid.

A thermoset composition comprises a lignin, a polyol-carrier compound and an isocyanate. The lignin is mixed with the polyol-carrier compound. The polyol-carrier compound is selected from the group consisting of ethoxylated or propoxylated phenols, or blends thereof; chloroisopropyl phosphates; butoxyethanols; amino methyl propanols; glycerin carbonates; polyether modified polysiloxanes; phthalic anhydrides; diethylene glycol-phthalic anhydride-based polyester polyol; bromophthalic anhydride derivatives; propanediols; bromine, chlorine, and/or phosphorus based fire retardants; epoxies; glycerins; sugar; glycols; certain natural oil based polyols and ethoxylated and/or propoxylated alcohols. The lignin-polyol-carrier compound mixture is reacted with the isocyanate producing a foam, plastic or other material.

A process for making a solid meltable material, said solid meltable material has thermoplastic properties, comprising the steps of: mixing lignin and with the same polyol-carrier compounds as set forth above in connection with the composition, namely, the polyol-carrier compound selected from the group consisting of ethoxylated or propoxylated phenols, or blends thereof; chloroisopropyl phosphates; butoxyethanols; amino methyl propanols; glycerin carbonates; polyether modified polysiloxanes; phthalic anhydrides; diethylene glycol-phthalic anhydride-based polyester polyol bromophthalic anhydride derivatives; propanediols; bromine, chlorine, and/or phosphorus based fire retardants; epoxies; glycerins; sugar; glycols; certain natural oil based polyols and ethoxylated and/or propoxylated alcohols; heating said polyol-carrier compound-lignin mixture until a hot miscible liquid is formed; and, pouring miscible liquid mixture into a suitable container and allowing the liquid to cool forming a solid brown meltable material with thermoplastic properties.

A process for making a thermoset material, comprising the steps of: mix lignin 1-60% by weight and polyol-carrier compound 40-99% by weight, said polyol-carrier compound selected from the group consisting of ethoxylated or propoxylated phenols, or blends thereof; chloroisopropyl phosphates; butoxyethanols; amino methyl propanols; glycerin carbonates;

polyether modified polysiloxanes; phthalic anhydrides; diethylene glycol-phthalic anhydride-based polyester polyol; bromophthalic anhydride derivatives; propanediols; bromine, chlorine, and/or phosphorus based fire retardants; epoxies; glycerins; sugar; glycols; certain natural oil based polyols and ethoxylated and/or propoxylated alcohols; heating said polyol-carrier compound-lignin mixture until a hot miscible liquid is formed.

DESCRIPTION OF THE INVENTION

A blend of lignin and polyol-carrier compounds can produce a polyol with several advantages. The hydroxyl number of these compounds (the lignin polyol-carrier compound blends) is relatively low compared to most polyether or polyester (polyols) which allows a substantial reduction of isocyanate which in turn achieves cost savings, better moisture resistance, and fire retardency. Bromine, chlorine, and/or phosphorus based fire retardents have a hydroxyl number of zero. Applications include, but are not limited to, foams, thermoset plastics, binders, fire retardant plywood binders, coatings, and thermoplastic applications. As a consequence of their solubilizing properties these same materials can also be used to make thermoplastic material.

The polyol carrier compounds are blended with lignin and then combined with an isocyanate to form foam, plastic or other material.

As set forth in U.S. Pat. No. 6,025,452, it is stated: "Foams and urethane plastics are made by reacting a polyol with an isocyanate with a functionality of at least 2 (two) or greater. The polyol can be a polyester (or polyether) molecule which has at least a functionality of at least 2 or greater. The polyol can also be a polyether polyol which is made by reacting propylene oxide or ethylene oxide with a molecule such as ethylene glycol or glycerin (or sugar or other starch material) to produce molecules with various molecular weights, which have pendant hydroxyl groups which will react with difunctional or multifunctional isocyanates to produce a solid plastic or foam. Without a lignin polyol in order to produce a rigid foam or urethane plastic it is necessary (customary) to react one part polyol (blend— this is partly to do with the 1:1 by volume ratio needed for spray foam rigs) with one part isocyanate. This is because the isocyanate generally contains aromatic rings and this is what makes the foam rigid, as well as having a high crosslink density. Also, a major disadvantage of these high levels of isocyanate is that when the foam is burned, high levels of toxic gases are produced which are generally derived from the isocyanate part of the molecule. It would be a tremendous advantage to be able to reduce the toxic fumes."

These toxic gasses formed from burning foam are classified the same as gasses emanating from burning wood.

The advantage of using ethoxylated or propoxylated phenols, or blends thereof, tris-chloroisopropyl phosphates, bromophthalic anhydride derivatives, propanediols, bromine, chlorine and/or phosphorus based fire retardants, epoxies, glycerins, sugar glycols, certain natural oil based polyols and ethoxylated and or propoxylated alcohols as the polyol carrier is that they further lower the level of isocyanate needed to produce a thermoset plastic. Persons of ordinary skill in the art would recognize that the polyol carrier compounds identified above have a low number of hydroxyl groups and thus act as a carrier liquid for solid lignin which has many hydroxyl groups. The two combined form a miscible polyol-lignin mixture. The hydroxyl number of fire retardant TCPP (tris-chloroisopropyl phosphate) is actually 0 and the hydroxyl number of bromophthalic anhydrides are much lower than polyesters and polyethers. For example the blend of TCPP and lignin reacts with isocyanate. However, TCPP alone will not react with isocyanates. Lignin and isocyanate react. TCPP is completely unreactive with isocyanates.

The polyol-carrier compound may be a chloroisopropyl phosphate such as TCPP, TECP, TMCP, and TDCP. TCPP, TECP, TMCP, and TDCP all have a hydroxyl number of zero. TCPP, TECP, TMCP, and TDCP may be used a polyol carrier compounds and they are all fire retardants. Persons of ordinary skill in the art at the time of filing the priority documents understand that the abbreviated standard for these compounds are as follows:

TCPP also known as TMCP or tris (1-chloro-2-propyl) phosphate or tris (2-chloroisopropyl) phosphate, or phosphoric acid, tris (2-chloro-1-methyl) ether;

TCEP also known as trichlorethyl phosphate or tris (2-chloroethyl)-ester or tris (2-chloroethyl) phosphate or ethanol, 2-chloro-phosphate (3:1) or tris (2-chloroethyl) orthophosphate; and, TDCP also known as tris (1,3-dichloroisopropyl) phosphate or tris (1-chloromethyl-2-chloroethyl) phosphate or 2-propanol, 1,3-dichloro-phosphate (3,1). Common MSDS data sheets, known in the art at the time of filing Ser. No. 13/769,759 on Feb. 18, 2013, explain and identify the TCPP, TECP, TMCP, and TDCP.

The polyol may be a natural oil based polyol such as AGROL DIAMOND®, HONEYBEE® 530, JEFFADD® B650, HONEYBEE® 230M, of which are all chemically modified natural oil polyols. These polyols unlike the ployols of Kurple '452 are not made from a combination of propylene oxide or ethylene oxide. Rather the natural oil based polyols such as AGROL DIAMOND®, HONEYBEE® 530, JEFFADD® B650, HONEYBEE® 230M are made from a transesterfication of a natural oil.

If the lignin molecule is used as part of the polyol portion of the system the amount of isocyanate needed can be reduced 40% or more and a rigid foam is produced. This reduces the amount of toxic gases that are derived from the isocyanate portion of the system.

The lignin molecule is a natural phenolic type molecule that occurs in wood, straw, sugar cane and other natural materials. Generally the majority of the lignin that is produced as a byproduct of the pulping process to make paper is just burned to recover heat value. Any lignin from the Kraft pulping process, sulfite pulping process, semi mechanical pulping process, solvent process, steam explosion process and biomass process can be used.

Depending on the processing technique, lignin may have some residual sugars left from processing especially when it is separated from biomass refining. In fact, sugar levels may be adjusted to optimize fire retardancy on an application by application basis. For example, in regard to the manufacture of urethane foams, sugar levels may be adjusted to yield excellent fire resistant properties and those properties (flame spread and smoke) can be determined, for example, by performing E-84 tunnel testing. Other products manufactured by the process disclosed herein include binders and coatings. Binders having fire-resistant properties are used in pressboard, fire resistant wood binder, plywood, foundry resins, and briquettes. Paints, floor coatings, wall coatings, roof coatings and sealants having fire-resistant properties are manufactured by the process disclosed herein.

Lignin is used along with polyol carrier compounds elected from the group of ethoxylated or propoxylated phenols, or blends thereof; chloroisopropyl phosphates; butoxyethanols; amino methyl propanols; glycerin carbonates; polyether modified polysiloxanes; phthalic anhydrides; diethylene glycol-phthalic anhydride-based polyester polyol; bromophthalic anhydride derivatives; propanediols; bromine, chlorine, and/or phosphorus based fire retardants; epoxies; glycerins; sugar; glycols; certain natural oil based polyols and ethoxylated and/or propoxylated alcohols.

Lignin significantly improves the moisture resistance of foam. In fact, when the proper level of lignin is used in a urethane foam the urethane foam will be almost impervious to moisture. Another major advantage of using lignin as a part of the polyol system is the flame resistance of the finished foam or urethane plastic part. Using bromine, chlorine and/or phosphorus based fire retardants further enhances fire resistance.

Example 1

In a suitable vessel, use heat and/or pressure to blend 300 parts by weight lignin and 700 parts by weight polyol carrier compound selected from the group consisting of ethoxylated, chloropropyl phosphates, bromophthalic anhydrides (derivatives), propanediols, and natural oil based polyols. A phase-stable liquid material results from this process. This produces the polyol part of the thermoset product. The thermoset product includes a further reaction with isocyanate as set forth in example 2 below.

Example 2

In order to make a thermoset plastic, 2 parts polyol carrier compound-lignin mixture by weight as described in example 1, and 1 part isocyanate (RUBINATE® R-1840) by weight are mixed and then poured into a suitable container and a free rise foam results.

Example 3

In order to produce foam, 2 parts polyol carrier compound-lignin mixture by weight as disclosed in example 1 is premixed with 0.5% water and/or ENNOVATE® (a blowing agent) at a percentage determined by the desired density. A suitable surfactant (silicone surfactant) and a suitable catalyst Niax A-33 (gelling catalyst) and Niax A-1 (blowing catalyst) may be used for a desired property. Then 3 parts polyol carrier compound-lignin-water-blowing agent-silicone surfactant-catalyst and 2 parts RUBINATE® R-1840 (isocyanate) are poured into a suitable container and a free rise low density foam will results.

Example 4

In order to make a coating using the polyol part set forth in example 1, (one) 1 part polyol carrier compound by weight of example 1 is mixed with 1 part by weight of a suitable coating solvent forming a premix. Then this premix is mixed with 1 (one) part RUBINATE® R-1840 (isocyanate) by weight and the resulting mixture is a coating. The coating may be a paint, a floor coating, a wall coating, a roof coating and or a sealant. Bromine, chlorine and/or phosphorus based fire retardants may be included in the mixture at a ratio of between 1-70%. The viscosity of this resulting mixture can be adjusted with suitable solvents depending on the final coating application.

Example 5

The polyol-carrier compound from example 1 at a level of 20-30% by weight is heated in a suitable vessel to 200 F then 70-80% lignin by weight is added and then heating is continued as high as 300 F until a single hot miscible liquid is achieved. Material is then poured and allowed to cool. A solid brown meltable material is produced with thermoplastic properties.

The invention has been set forth by way of example only. Those skilled in the art will recognize that changes and modifications may be made to the invention without departing from the spirit and the scope of the invention as set forth in the claims below.

The invention claimed is:

1. A process for making a lignin-based fire-retardant thermoplastic comprising the steps of:
    mixing lignin and polyol carrier compounds to form a mixture of said lignin and said polyol carrier compounds;
    wherein at least one polyol carrier compound is selected from a first group and at least one other polyol carrier compound is selected from a second group, wherein the first group consists of bromine based fire retardants; chlorine based fire retardants; phosphorus based fire retardants; and combinations thereof; and, where the second group consists of butoxyethanol; amino methyl propanol; glycerin carbonate; siloxane; phthalic anhydride; bromophthalic anhydride derivative; epoxy; glycerin; and combinations thereof;
    heating said mixture of said lignin and said polyol carrier compounds until a hot miscible liquid mixture is formed;
    and,
    pouring said hot miscible liquid mixture of lignin and said polyol carrier compounds into a container and allowing said hot miscible liquid mixture to cool so that a solid lignin-based fire-retardant thermoplastic is formed.

2. A process for a lignin-based fire-retardant thermoplastic as claimed in claim 1, wherein said polyol carrier compounds are provided in an amount of 20-30% by weight and said lignin is provided in an amount of 70-80% by weight relative to said mixture of said lignin and said polyol carrier compounds.

3. A process for making a lignin-based fire-retardant thermoplastic as claimed in claim 1, wherein heating said mixture of said lignin and said polyol carrier compounds until a hot miscible liquid mixture is formed is performed at a temperature of 160-390° F.

4. A process for making a lignin-based fire-retardant thermoplastic as claimed in claim 1, wherein said lignin is prepared from a Kraft pulping process, a sulfite pulping process, a semi-mechanical pulping process, a solvent process, or a steam explosion process.

5. A process for making a lignin-based fire-retardant polyol comprising the steps of:
    mixing lignin and polyol carrier compounds to form a mixture of said lignin and said polyol carrier compounds;
    at least one polyol carrier compound is selected from a first group and at least one other polyol carrier compound is selected from a second group, wherein the first group consists of bromine based fire retardants; chlorine based fire retardants; phosphorus based fire retardants; and combinations thereof; and, where the second group consists of butoxyethanol; amino methyl propanol; glycerin carbonate; siloxane; phthalic anhydride; bromophthalic anhydride derivative; epoxy; glycerin; and combinations thereof;
    heating said mixture of lignin and said polyol carrier compounds until a hot miscible liquid mixture is formed, thereby creating a lignin-based fire-retardant polyol;
    and,
    pouring said hot lignin-based fire-retardant polyol into a container to cool.

6. A process for making a solid lignin-based fire-retardant polyol as claimed in claim 5, wherein said polyol carrier compounds are provided in an amount of 40-99% by weight and said lignin is provided in an amount of 1-60% by weight.

7. A process for making a lignin-based fire-retardant polyol as claimed in claim 6, wherein said step of: heating said mixture of lignin and said polyol carrier compounds is performed at a temperature of 160-390° F.

8. A process for making a lignin-based fire-retardant polyol as claimed in claim 5, wherein said lignin is prepared from a Kraft pulping process, a sulfite pulping process, a semi-mechanical pulping process, a solvent process, or a steam explosion process.

* * * * *